United States Patent Office

3,490,998
Patented Jan. 20, 1970

3,490,998
PURIFICATION OF THIOPHENOLS BY AZEOTROPIC DISTILLATION WITH A PARAFFIN ENTRAINER
Donald C. Jones, Pittsburgh, Pa., assignor to Consolidation Coal Company, Pittsburgh, Pa., a corporation of Delaware
Filed Nov. 22, 1968, Ser. No. 778,052
Int. Cl. B01d 3/36; C07c 149/32
U.S. Cl. 203—52                            4 Claims

ABSTRACT OF THE DISCLOSURE

Phenolic impurities are removed from thiophenols by the addition of a $C_{10}$ to $C_{12}$ paraffinic hydrocarbon and the subsequent fractionation of the mixture.

---

Figure 1:
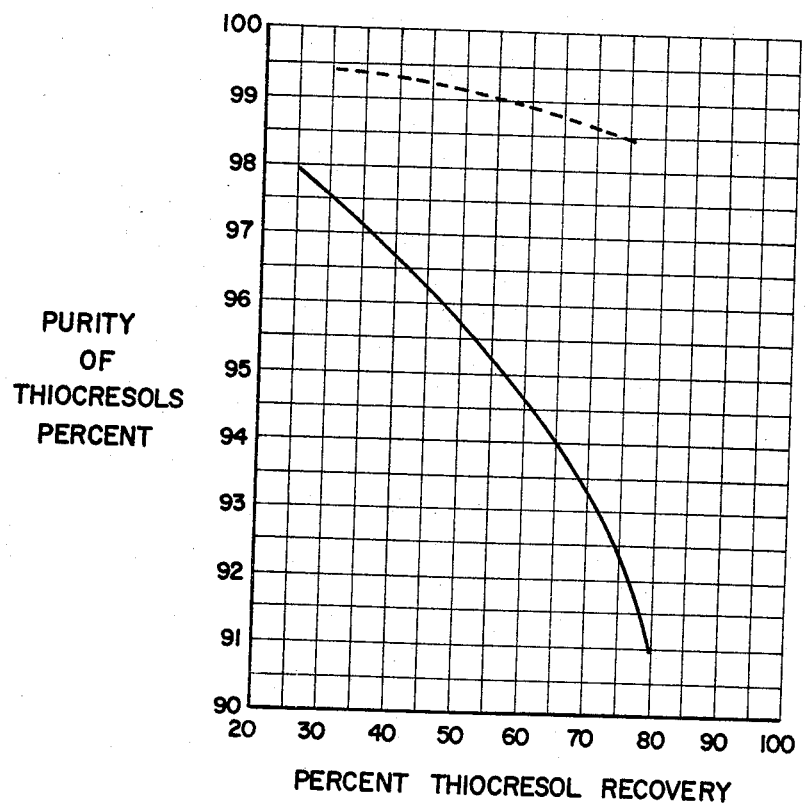

This invention relates to a method of purifying thiophenols, and more particularly, to a method of removing phenolic impurities from thiophenols.

At present, thiophenols are obtained principally from two sources: by synthetic methods starting with benzene, and as by-products of the caustic extraction of petroleum distillates. In one widely used direct synthesis technique, benzene is converted to benzene sulfonyl chloride by treatment with a molar excess of chlorosulfonic acid. The product is then converted to thiophenol by reduction in the presence of a metal acid system. While the resulting product is of high purity and is particularly useful for paint, dyestuffs, and pharmaceutical applications, it is relatively expensive. This limits its use for many applications.

Petroleum distillates resulting from oil cracking processes usually contain phenols and thiophenols and both are regarded as undesirable impurities. They are generally removed by extraction with aqueous caustic; the phenols being converted to phenolate salts and the thiophenols to thiophenolate salts. The phenols and thiophnols may then be recovered or "sprung" simply by adding a mineral acid or $CO_2$ to the caustic solution. The crude mixture thus obtained contains from 75 to 99.5 weight percent phenols and 25 to .5 weight percent thiophenols. This mixture would provide a very economical source of phenols and thiophenols were it not for the difficulty encountered in separating them from one another.

U.S. Patent 2,767,220, assigned to the assignee of this invention, sets forth a process for purifying phenols contaminated with thiophenols. In that process, a feedstock composed principally of phenols and thiophenols sprung from aqueous caustic is contacted with aqueous methanol and a low boiling paraffinic naphtha in a continuous countercurrent extraction zone. The aqueous methanol solution dissolves substantially only phenols while the naphtha dissolves the thiophenols. The thiophenols can be recovered as still bottoms from the distillation of the naphtha. However, since the purification of the phenols is the desideratum of that process, the thiophenols obtained as still bottoms invariably contain 2 to 20 weight percent phenols.

One of the most generally desirable ways to separate volatile organic compounds is fractional distillation. The process is simple, versatile and economical. Unfortunately, this particularly advantageous technique cannot provide an acceptably complete separation of phenols from crude thiophenols.

For example, in the fractionation of crude thiocresols, the removal of o-cresol, 2,6-xylenol and m,p-cresol cannot be achieved at an economically feasible level of recovery. The solid curve in FIGURE 1 of the drawings illustrates the relationship between purity and recovery of thiocresols. It can be seen that while straight fractionation can provide recovery near the desirable 98+ percent level, such purity can be obtained only at recovery levels of about 20 percent. The cost of distilling thiocresols at 20 percent recovery would be prohibitive.

A comparison of the boiling points of thiocresols and the phenols which contaminate them reveals the source of part of this difficulty.

TABLE I

| Compound: | B.P., ° C. at 400 mm. Hg |
|---|---|
| o-Cresol | 168.5 |
| Thiocresols | 173 |
| 2,6-xylenol | 178 |
| m,p-Cresols | 181 |

The table shows that not only are these boiling points quite close, but also the boiling point of the thiocresols falls among the boiling points of the various phenols.

The difficulty encountered in the separation of thiophenol from phenol illustrates another aspect of this problem. Phenol boils at 160° C. at 400 mm. Hg and thiophenol at 148° C. at 400 mm. Hg. One would normally expect that the 12° temperature difference would be sufficient for a fairly clean-cut separation. Yet even when the crude thiophenol is distilled in a very efficient column such as a 50-plate packed tower, the resultant purified thiophenol contains an irreducible minimum of about 1.5% phenol. I believe that the difficulty in removing this last small amount of phenol is caused by the formation of a phenol-thiophenol azeotrope.

There is evidence that other thiophenols and phenols form azeotropes. In the fractionation of crude thiocresols, for example, m,p-cresol invariably distills off before 2,6-xylenol even though m,p-cresol normally boils a few degrees above 2,6-xylenol (see Table I). This phenomenon is suggestive of the formation of a m,p-cresol-thiocresol azeotrope.

The prior art methods for removing phenols from thiophenols take advantage of differences in their chemical rather than physical properties. One such process is described in U.S. Patent 2,957,029, also assigned to the assignee of this invention. In that process, the crude thiophenols containing phenols are contacted with aluminum at a temperature at which the phenols react selectively to form aluminum phenoxides. The thiophenols are then separated from the relatively nonvolatile phenoxides, usually by distillation. Although this process is highly effective in obtaining pure thiophenols, it obviously is not as uncomplicated or inexpensive as fractional distillation.

The primary object of this invention is to provide a process for removing phenolic impurities from thiophenols selected from the class consisting of thiophenol itself, thiocresols and thioxylenols by a simple fractional distillation technique.

In accordance with this invention in its broadest aspects, I have provided a process for removing phenolic impurities from thiophenols selected from the class consisting of thiophenol itself, thiocresols and thioxylenols which comprises:

(a) Adding at least one paraffinic hydrocarbon containing 10 to 12 carbon atoms/molecule to said thiophenols in sufficient amount to form minimum boiling azeotropes with at least some of the phenolic impurities, (b) Fractionally distilling the mixture from step (a) to remove the minimum boiling azeotropes, and (c) Continuing the distillation to recover said thiophenols.

This invention is based on my discovery that minimum boiling azeotropes composed of (1) phenols selected from the class consisting of phenol itself, cresols, and xylenols, and (2) paraffins containing ten to twelve carbon atoms per molecule are readily separable from thiophenols selected from the class consisting of thiophenol itself, thiocresols and thioxylenols. I have further discovered that thiophenols, although chemically very similar to phenols, do not form minimum boiling azeotropes with paraffins containing ten to twelve carbon atoms per molecule. I have still further discovered that the addition of the indicated paraffinic hydrocarbon to a mixture of thiophenols and phenols prevents the formation of any azeotropes of thiophenols and phenols which normally would be expected to form. Thus, by adding a sufficient amount of the paraffin or paraffins to crude thiophenols, the effective boiling points of the phenolic impurities may be lowered to a point where their separation becomes much easier.

Figure 2:
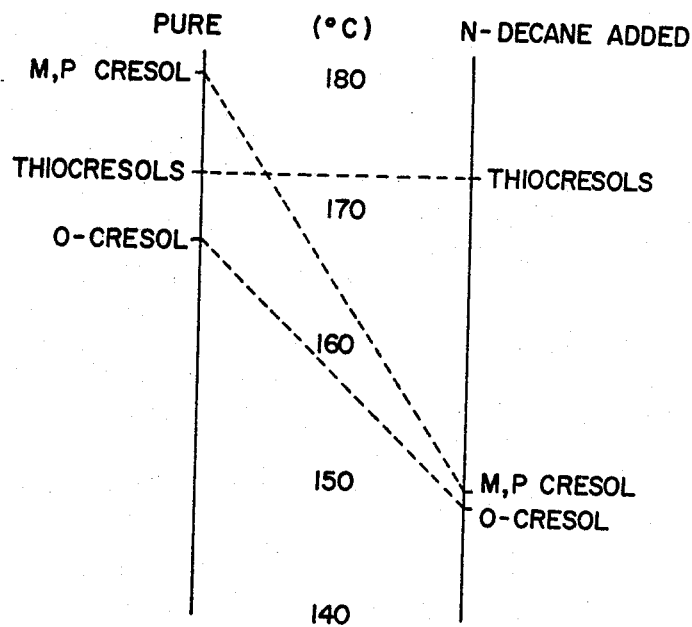

FIGURE 2 illustrates the effectiveness of the paraffin in the case of the removal of o-, m-, p-cresols from thiocresols. It can be seen that, without the addition of the paraffin, the boiling point of the thiocresols falls between and close to the boiling points of the cresols. With the addition of the paraffin, the effective boiling points of the cresols fall well below that of the thiocresols with the minimum boiling point separation being 23° C.

Some examples of the n-paraffin azeotropes of phenols pertinent to this invention are listed in Table II below. The numbers in the parentheses are weight percents of the indicated phenolic compound. The temperatures are expressed as ° C. The pressure in all examples is 400 mm. Hg.

TABLE II.—BOILING POINTS OF PHENOLS AND THEIR n-PARAFFIN AZEOTROPES

| | Phenol | | | | |
|---|---|---|---|---|---|
| | None | o-Cresol | 2,6-xylenol | m,p-Cresol | Phenol |
| Paraffin: | | | | | |
| None | | 168.5 | 178 | 181 | 160 |
| n-Decane | 150.5 | 149 (23%) | 152.5 (4%) | 150 (15%) | 142.5 (32%) |
| n-Undecane | 172 | 160.5 (45%) | 169 (36%) | 164 (33%) | |
| n-Dodecane | 191 | 167 (72%) | 177 (72%) | 173 (53%) | |

A few examples will best serve to illustrate the operation of the process of this invention. In these examples, the same general procedure was followed: The fractionations were carried out in a 1″ x 3½′, 25 theoretical plate, Cannon packed column. The column was operated at a pressure of 400 mm. of Hg. The various fractions were analyzed by vapor phase chromatography.

EXAMPLE 1

For purposes of comparison, a fractionation of crude thiocresols was carried out without the addition of a paraffin. The major phenolic contaminants of the thiocresols were 7.47% o-cresol, 1.88% 2,6-xylenol, and 3.80% m,p-cresols. The fractionation was carried out using the following reflux ratios.

| Fractions: | Reflux ratio |
|---|---|
| 1 | 0 |
| 2 | 5/1 |
| 3 | 5/1–20/1 |
| 4–7 | 20/1 |
| 8–13 | 15/1 |
| 14–15 | 0 |

The lower curve consisting of a solid line in FIGURE 1 is a plot of purity vs. recovery for this fractionation.

EXAMPLE 2

In this fractionation, crude thiocresols of about the same composition as those in Example 1 were mixed with a mixture of paraffins (25% n-decane, 70% n-undecane, and 5% n-dodecane) corresponding to 23 weight percent of the total charge. The mixture was fractionated following the same procedure used in Example 1. The reflux ratios were the same or lower, i.e.:

| Fractions: | Reflux ratios |
|---|---|
| 1–23 | 15/1 |
| 24 | 5/1–0 |
| 25 | 0 |

The upper curve consisting of a broken line in FIGURE 1 is the plot of purity vs. recovery for this fractionation. A comparison with the curve derived from Example 1 reveals that the addition of paraffin considerably increases the efficiency of the fractionation of the crude thiocresols.

EXAMPLE 3

Thiophenol containing 1.9% phenol was mixed with n-decane corresponding to 32 weight percent of the thiophenol charged. The mixture was fractionated following the procedure used in the previous examples. After 53% of the hydrocarbon had been distilled, analysis of the remaining thiophenol (75% of that charged) showed that it contained about .1% phenol. Reduction of the percentage of phenol to this level is a significant improvement over the previously irreducible minimum of 1.5% phenol that could be obtained by fractionation without the addition of a paraffin.

The composition and boiling points of the components of a typical mixture of crude thiophenols are given in Table III:

TABLE III

| | Approx. wt. percent | B.P. ° C. at 400 mm. Hg |
|---|---|---|
| Component: | | |
| Thiophenol | 12.1 | 148 |
| Phenol | 3.5 | 160 |
| o-Cresol | 6.3 | 168.5 |
| Thiocresols | 60.0 | 173 |
| 2,6-xylenol | 1.5 | 178 |
| m,p-Cresols | 3.0 | 181 |
| 2,4-, 2,5-xylenols | 2.4 | 186 |
| Thioxylenols | 4.0 | 186–198 |
| Residue H.O. impurities, etc. | 3.8 | |

Preferably, crude thiophenols of the composition tabulated in Table III are predistilled or "topped" to remove most of the phenol and thiophenol. The two fractions are then treated separately. The phenol-thiophenol rich fraction is fractionated as in Example 3, while the fraction rich in thiocresols is treated as in Example 2. The thiocresols are separated from the higher boiling phenols and thiophenols such as 2,4-, 2,5-, 2,6-xylenols and thioxylenols by straight fractionation.

The three n-paraffins and their mixtures are generally preferred in the process of this invention, but the $C_{10}$–$C_{12}$ branched-chain paraffins may also be used. The choice of the most advantageous paraffin or mixture of paraffins from the $C_{10}$ to $C_{12}$ group obviously depends on the thiophenol to be purified and the amount of paraffin that can be tolerated in the purified product.

Table IV tabulates results obtained using pure n-decane and two mixtures of paraffins for the recovery of pure thiocresols from crude thiocresols, to show the relative effects of mixtures of parffins and a pure paraffin. The only difference is the low paraffin content (.3%) in the case of the use of n-decane.

TABLE IV

|  | Paraffins | | |
| --- | --- | --- | --- |
|  | n-Decane 100% | n-Decane, 90%, n-Undecane, 10% | n-Decane, 25%, n-Undecane, 70%, n-Dodecane, 5% |
| Wt. percent charge | 38.7 | 39.0 | 25.3 |
| Recovery of thiocresols, percent | 86.1 | 86.5 | 76.0 |
| Purity of thiocresols, percent | 98.4 | 98.8 | 98.4 |
| Wt. percent paraffin | .3 | 5.7 | 6.9 |

The presence of a few percent paraffins that results when mixtures of the paraffins are used is not objectionable in many applications. In a sense, fractionation using a mixture of paraffins might be regarded as a way to exchange an objectionable impurity for an unobjectionable one.

It should also be noted that, if desired, the neutral paraffins may be separated from the thiophenols quite easily and very completely by extraction with aqueous caustic.

The amount of paraffin to be used must be determined for the most part empirically. The amount needed to azeotrope with the phenols present may serve as a starting point. Any additional amount needed to destroy phenol-thiophenol azeotropes must be determined experimentally. It is obvious to one skilled in the art that such variables as the type of column used, the purity desired, the paraffin or mixture used will uniquely determine the optimum amount of paraffin.

Finally, the fractionations may be conducted at a wide range of pressures. The advantages that may be obtained by variations in pressure are also familiar to those skilled in the art. In my examples, all fractionations were conducted at 400 mm. of Hg but there is no reason why they could not have been conducted at, for example, ambient pressure.

According to the provisions of the patent statutes, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated and described.

I claim:

1. In the method of removing phenolic impurities from thiophenols selected from the class consisting of thiophenol itself, thiocresols and thioxylenols, the steps of:
    (a) adding paraffinic hydrocarbons containing ten to twelve carbon atoms per molecule in an amount at least sufficient to form minimum boiling azeotropes with any phenols present from the class consisting of phenol itself, cresols and xylenols,
    (b) fractionally distilling the mixture obtained in step (a) to remove said minimum boiling azeotropes, and
    (c) continuing the distillation to recover the thiophenols.

2. The method according to claim 1 in which the paraffinic hydrocarbon used is a mixture of n-decane, n-undecane, and n-dodecane.

3. The method according to claim 1 in which the paraffinic hydrocarbon used is a mixture of n-decane and n-undecane.

4. The method according to claim 1 in which the paraffinic hydrocarbon used is n-decane.

References Cited
UNITED STATES PATENTS

| 2,236,723 | 4/1941 | Yabroff et al. | 260—627 |
| 2,339,576 | 1/1944 | Luten | 203—84 XR |
| 2,681,369 | 6/1954 | Hess et al. | 260—627 |
| 2,910,507 | 10/1959 | Jones et al. | 260—627 |
| 3,337,424 | 8/1967 | Neuworth et al. | 260—627 |
| 3,397,124 | 8/1968 | Parisse | 203—70 |

WILBUR L. BASCOMB, JR., Primary Examiner

U.S. Cl. X.R.

203—65, 70, 80, 91, 57, 44; 260—627, 609